United States Patent Office 3,718,379
Patented Feb. 27, 1973

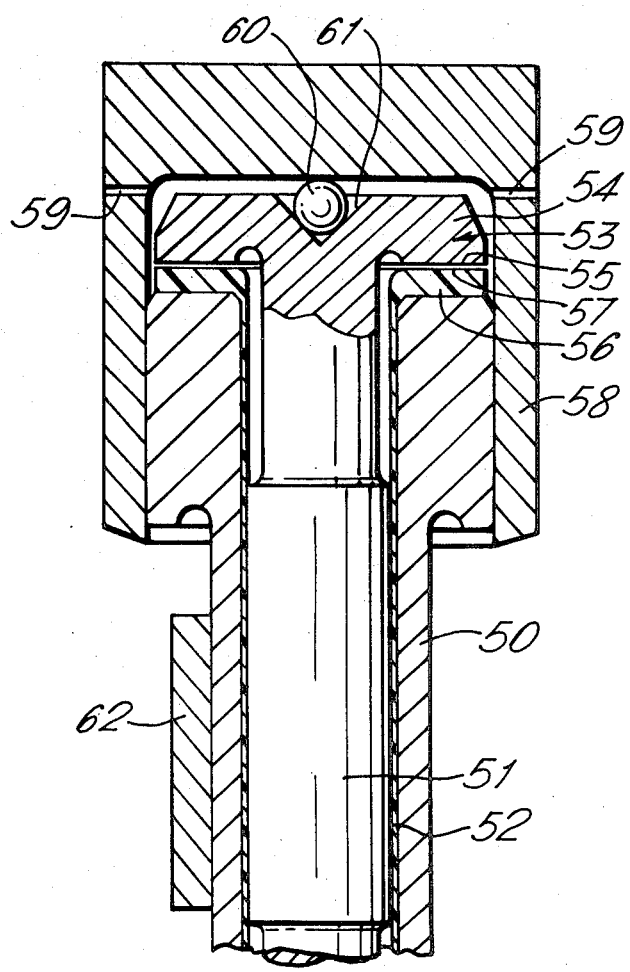

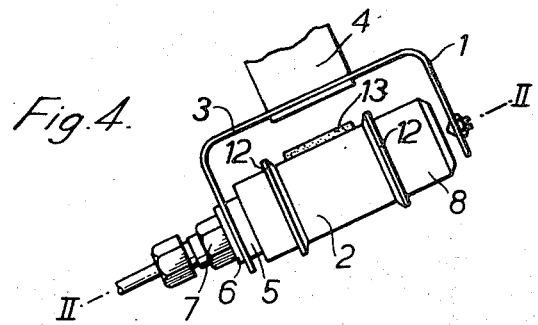
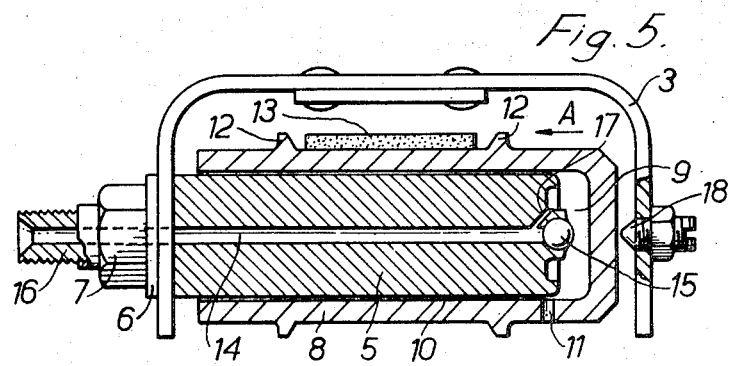
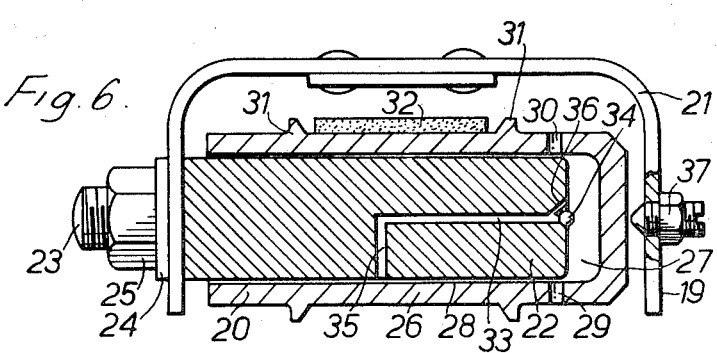
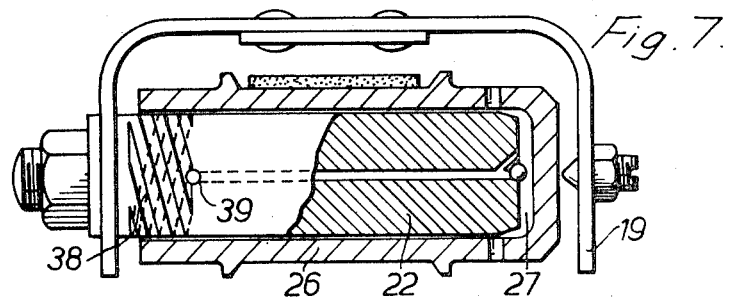

3,718,379
AIR BEARINGS
Raymond Williams and Robert Edwin Leckenby, Appleton, England, assignors to United Kingdom Atomic Energy Authority, London, England
Filed Mar. 9, 1971, Ser. No. 122,341
Claims priority, application Great Britain, Jan. 1, 1971, 133/71
Int. Cl. F16c *17/16*
U.S. Cl. 308—9          5 Claims

ABSTRACT OF THE DISCLOSURE

A journal gas bearing assembly comprising a fixed bearing sleeve and a shaft rotatable in the bearing sleeve longitudinal movement of the shaft relative to the bearing sleeve in one direction being limited by a hydrostatic thrust bearing formed by a cushion of gas trapped under pressure in the bore of the bearing sleeve between an internal step in the bore of the bearing sleeve and an external step on the shaft.

BACKGROUND OF THE INVENTION

This invention relates to journal and bearing assemblies which operate with gas lubrication between the journal member and the bearing member.

A typical form of gas bearing assembly of the type referred to above comprises a shaft and a co-operating bearing sleeve, the surface of the shaft and the bore of the bearing sleeve being finished to an extremely high standard of accuracy and smoothness to provide bearing surfaces between which gas lubrication can be maintained under normal operating conditions.

There are two main types of journal gas bearing assembly.

In the first type, which is known as a hydrostatic pressure fed journal gas bearing, gas lubrication is maintained between the bearing surfaces of the shaft and the bearing sleeve by gas which is fed under pressure from an external source to the interspace defined between the bearing surfaces.

In the second type, which is known as a hydrodynamic self-acting gas journal bearing, gas lubrication is maintained between the bearing surfaces of the shaft and the bearing sleeve by the pressure generated hydrodynamically in gas in the interspace defined between the bearing surfaces due to relative rotation of the shaft and the bearing sleeve.

Gas bearing assemblies of the kind referred to above can be made relatively cheaply, as disclosed in British Pat. No. 979,731, by forming at least one of the bearing surfaces of the shaft and the bearing sleeve from a moulded plastic material such as an epoxy resin.

Both types of gas bearing assembly referred to above can be operated with the bearing sleeve rotatable on a stationary shaft or alternatively the shaft may be rotatable in a stationary bearing sleeve. In either case it is necessary to support the rotating member against longitudinal movement on the stationary member.

SUMMARY OF THE INVENTION

According to the present invention a journal gas bearing assembly comprises a fixed bearing sleeve, a shaft rotatable in the bearing sleeve, the surface of the shaft and the bore of the bearing sleeve having cooperating bearing surfaces of a quality such that gas lubrication can be sustained between the shaft and the bearing sleeve, the shaft having a part of major diameter separated by an external step from a part of minor diameter, the bore of the bearing sleeve having a corresponding part of major diameter separated by an internal step from a part of minor diameter, the shaft being supported against longitudinal movement in the bearing sleeve in one direction by a hydrostatic thrust bearing formed by a cushion of gas trapped in the closed volume within the bore of the bearing sleeve between the external step on the shaft and the internal step in the bore of the bearing sleeve, and means being provided for feeding compressed gas to the hydrostatic thrust bearing comprising an inlet port in the bearing sleeve connecting an external source of gas under pressure with the closed volume within the bore of the bearing sleeve.

Means may be provided for limiting longitudinal movement of the shaft in the bearing sleeve in the opposite direction to the direction in which the shaft is supported against longitudinal movement in the bearing sleeve by the hydrostatic thrust bearing, which means may comprise a vent hole in the bearing sleeve positioned so as to be obstructed by the surface of the shaft when the shaft is in its normal running position within the bearing sleeve, supported against longitudinal movement, in the one direction, in the bearing sleeve by the hydrostatic thrust bearing and such that on initial longitudinal movement of the shaft in the bearing sleeve in the opposte direction the vent hole in the bearing sleeve is uncovered by the shaft so that the closed volume within the bore of the bearing sleeve defining the hydrostatic thrust bearing is vented to atmosphere.

The shaft may be supported against longitudinal movement in the direction opposite to which the hydrostatic thrust bearing supports the shaft against longitudinal movement in the bearing sleeve by a hydrodynamic thrust bearing comprising a transverse annular bearing surface of the bearing sleeve and a corresponding transverse annular bearing surface on the shaft. The hydrodynamic thrust bearing may comprise a flange on the end of the minor diameter part of the shaft outside the bearing surface, the flange having an annular bearing surface facing a corresponding annular bearing surface on the adjacent end of the bearing sleeve.

The bearing sleeve may be flexibly mounted, and have a low transverse moment of inertia.

DESCRIPTION OF THE DRAWINGS

Embodiments of the invention will now be described by way of example with reference to the accompanying drawings in which FIGS. 1, 3, 4, 5, 6, 7, 8, and 9 are elevations of journal gas bearing assemblies having a bearing sleeve rotatable on a stationary shaft.

FIGS. 1–11 and the corresponding ensuing descriptions are primarily for explanatory purposes, the claimed invention of this application being exemplified by FIGS. 12 and 13.

DESCRIPTION OF THE PREFERRED EMBODIMENTS

Figure 1:
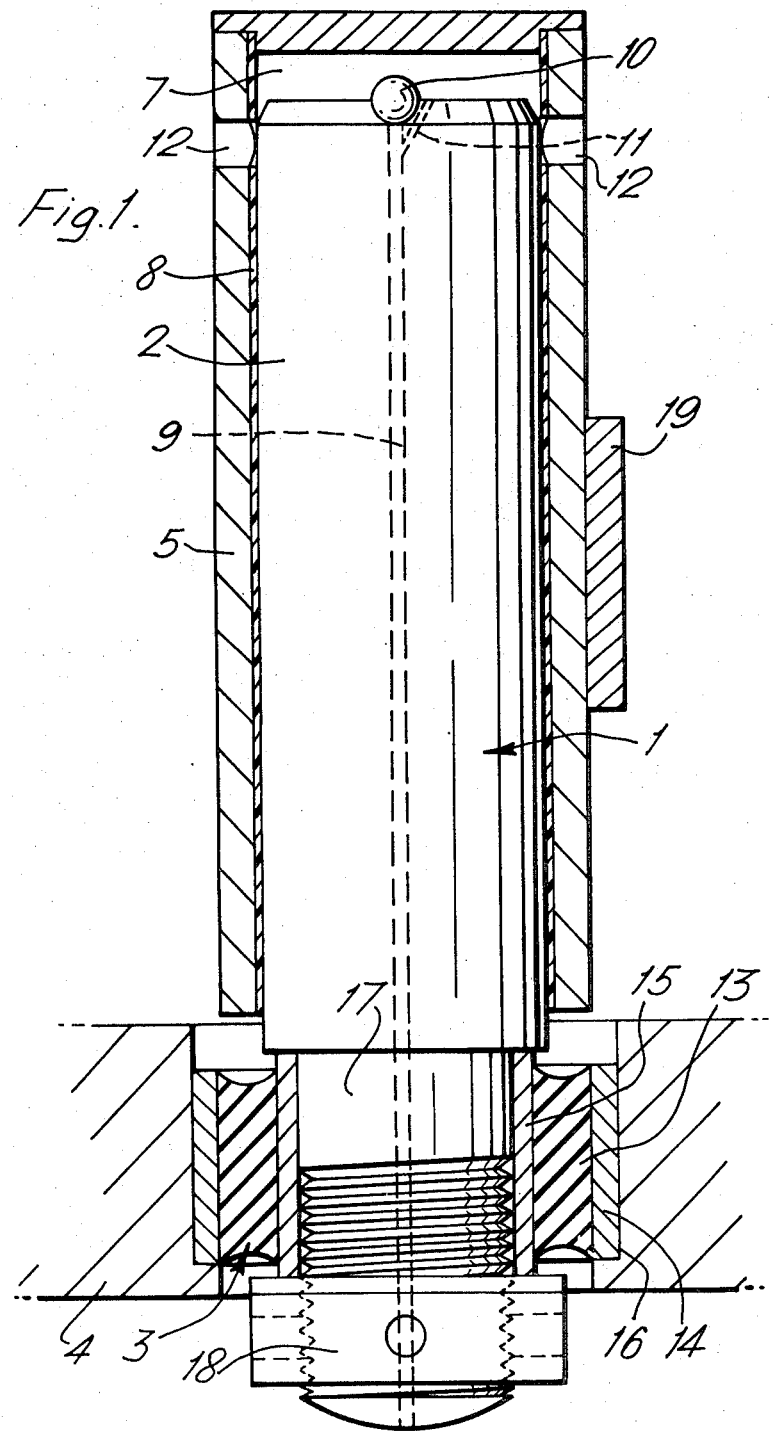

Referring to FIG. 1 of the drawings a bearing assembly 1 is shown in which a hard faced shaft 2 is supported by a flexible mounting 3 in a support member 4. The shaft is surrounded by a close fitting bearing sleeve member 5 which is rotatable on the shaft 2. The bearing sleeve 5 has a blind ended bore which provides a trapped volume 7 between the blind end of the bearing sleeve 5 and the end of the shaft 2. The shaft 2 has a precision ground outer surface and the bore of the bearing sleeve 5 has a plastic lining 8 formed with a surface of gas bearing quality complementary to the surface of the shaft 2. The bearing surface in the plastic lining 8 of the bearing sleeve 5 may be formed for example by the method disclosed in British Pat. No. 979,731.

The shaft 2 has a longitudinal drilling 9 which is sealed at the end of the shaft 2 inside the trapped volume 7 by a ball end stop 10. A feed jet 11 of smaller diameter than the drilling 9 connects the drilling 9, from just below the ball end stop 10, with the trapped volume 7. Adjacent the blind end of the bearing sleeve 5 there are two diametrically opposed vent ports 12.

The flexible mounting 3 comprises a ring 13 of soft rubber bonded between outer and inner metal sleeves 14 and 15. The outer metal sleeve 15 is an interference fit in a housing 16 in the support member 4. The shaft 2 has an end part 17 of reduced diameter which fits the inner metal sleeve 15 of the flexible mounting 3 and is threaded to fit a retaining nut 18.

In operation of the bearing assembly shown in FIG. 1 of the drawings the bearing sleeve 5 is driven on the shaft 2 by a friction drive belt 19 which engages the bearing sleeve 5 tangentially. The bearing assembly 1 operates as a hydrodynamic self acting gas journal bearing, transverse journal loads on the bearing sleeve 5 being supported by the pressure generated hydrodynamically in the air film in the interspace between the surface of the shaft 2 and the bearing surface in the plastic lining of the bearing sleeve 5.

Compressed air is fed into the trapped volume 7 at the blind end of the bearing sleeve 5 through the drilling 9 in the shaft 2. The pressurised cushion of air set up in the trapped volume 7 provides a hydrostatic thrust bearing supporting the bearing sleeve 5 longitudinally on the shaft 2. Under normal end loading conditions in the downward direction the bearing sleeve 5 runs on the shaft 2 in the position shown in FIG. 1, that is with the vent ports just covered by the end of the shaft 2. The compressed air is fed through the drilling 9 in the shaft 2 at a pressure sufficient to support the bearing sleeve 5 against normal downward end loading on the shaft 2. Transient variations in end loading acting on the bearing sleeve 5 are accommodated by longitudinal movement of the sleeve 5 on the shaft 2. For example a transient additional downward loading on the bearing sleeve 5 forces the bearing sleeve 5 down on the shaft 2. Because the ports 12 in the bearing sleeve 5 are covered by the end of the shaft 2 and because the feed jet 11 is of restricted cross section the additional downwards end loading acting on the bearing sleeve 5 is resisted by further compression of the air in the trapped volume 7. On return to normal end loading conditions the bearing sleeve 5 returns to its normal operational attitude on the shaft 2. On the other hand if the end loading acting downwardly on the bearing sleeve 5 reduces from normal the bearing sleeve 5 will lift on the shaft 2 so that the vent ports 12 in the bearing sleeve 5 are uncovered by the end of the shaft 2. Therefore the pressure of the cushion of gas in the trapped volume 7 falls to atmospheric pressure and the sleeve 5 drops back to assume its normal operational attitude on the shaft 2 when normal downwards end loading of the bearing sleeve 5 results.

Hydrodynamic self-acting journal gas bearings generally have a limiting speed of operation because of the difficulty of ensuring dynamic stability. The problem arises from the fact that the load carrying capacity of such bearings reaches a limiting value with increasing speed. In one form of instability the rotating member is subject to resonant oscillations at a critical speed which can result in damaging contact occurring between the bearing surfaces. One of the most serious forms of instability is the so called "half speed whirl" which results from the natural disposition of the rotating member of the bearing assembly to precess about a fixed centre at approximately the mean rotational speed of the air film between the bearing surfaces and which is excited to a sufficiently large amplitude to cause extensive damage by contact between the bearing surfaces when the precessional speed coincides with a natural resonance frequency of the rotating member of the bearing assembly.

The bearing assembly of FIG. 1 has several features which are of general significance in raising the speed at which such self acting hydrodynamic gas journal bearings can be operated before the onset of operational instability occurs.

A self acting hydrodynamic gas journal bearing may be rendered stable at higher operating speeds by subjecting the rotating member to a side loading so that it runs eccentrically with respect to the stationary member. In the bearing assembly of FIG. 1 the friction drive belt 19 applies such a side loading on the bearing sleeve 5. Also the friction drive belt 19 engages with the bearing sleeve 5 within the effective bearing length. Thus the transverse loading applied by the drive belt 19 on the bearing sleeve 5 is fully supported by the bearing and this system imposes the minimum transverse couple on the bearing sleeve 5 which is another factor contributing to stability of operation of the bearing at high speeds.

The mounting of the shaft 2 from one end by the flexible mounting 3 permits three damped degrees of freedom of movement of the shaft 2.

In the first two degrees of freedom of movement of the shaft 2 it can oscillate with the bearing sleeve 5 in a cylindrical mode or in a conical mode about the rotational axis of the bearing sleeve 5. These modes of freedom of movement of the shaft 2 result in the damping out of damaging resonant oscillations of the bearing sleeve 5 therefore allowing the bearing assembly to be run at speeds higher than those theoretically possible in a bearing assembly having a rigidly mounted shaft. Also the flexible mounting of the shaft 2 prevents the onset of "half speed whirl" of the bearing sleeve by absorption of energy from the bearing vibration and dissipation of the energy through damping in the rubber ring 13 of the flexible mounting 3. The third mode of freedom of the shaft 2 is in the longitudinal direction which provides for the damping of longitudinal oscillations of the bearing sleeve 5 on the shaft 2.

Also in the bearing assembly of FIG. 1, the friction drive belt 19 acts on the outer surface of the bearing sleeve 19 at a greater radius than the radius of the bearing sleeve 5. This means that the coefficient of friction between the drive belt 19 and the bearing sleeve 5 necessary in order to achieve drive of the bearing sleeve can be less than the coefficient of friction between the bearing surfaces. This enhances the ability of the bearing to start up from rest when maximum friction between the bearing surfaces exists. In addition the stationary shaft 2 has a low transverse moment of inertia so that it may readily follow any oscillations set up by the rotating bearing sleeve 5 either by resonance or out of balance forces and therefore reduces the loading imposed on the air film in the interspace between the surface of the shaft 2 and the bearing surface in the plastic lining of the bearing sleeve 5 consequently allowing larger amplitudes of oscillation to be tolerated.

Figure 2:
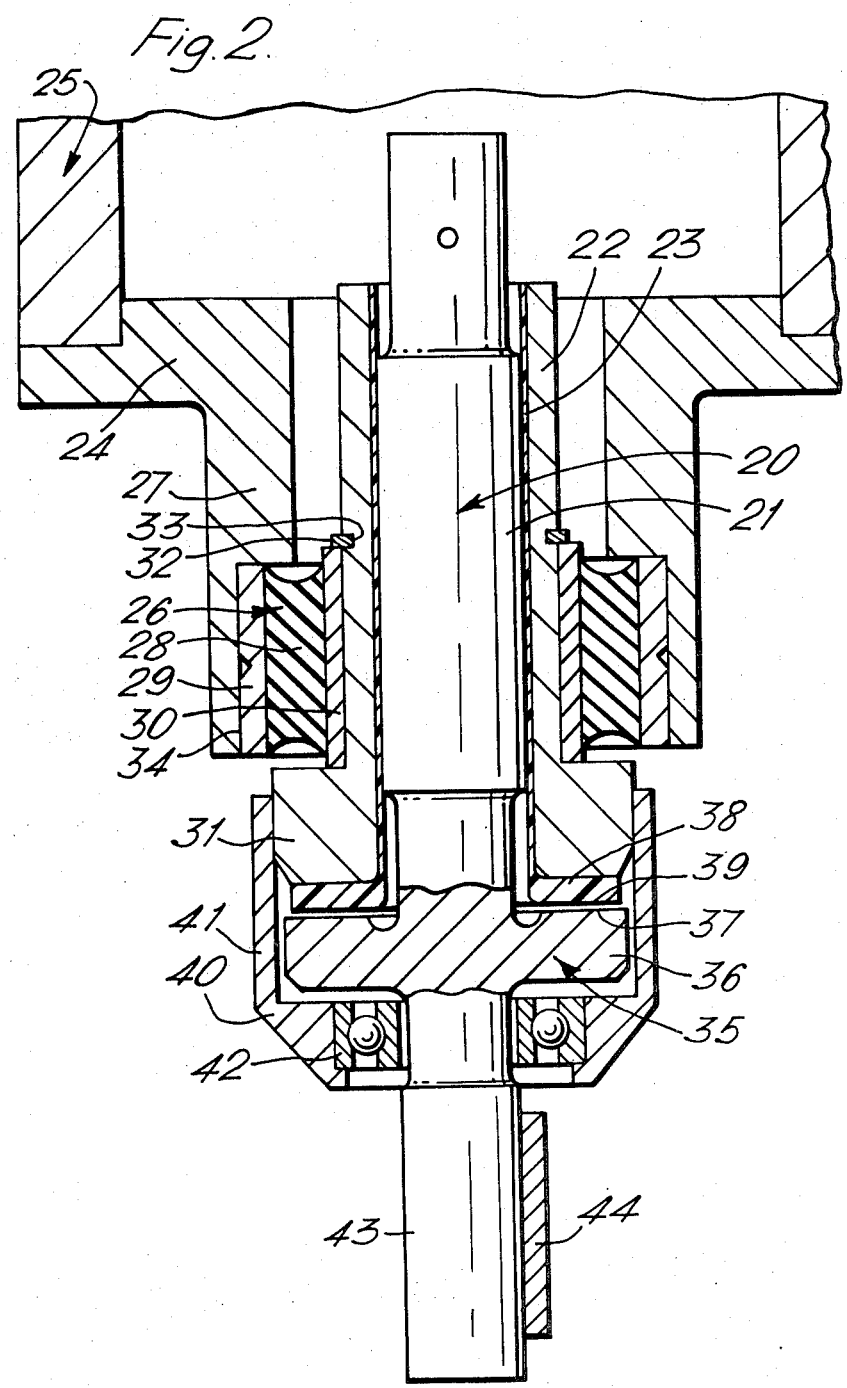
FIGS. 2, 10, 11, 12 and 13 are elevations of journal gas bearing assemblies having a shaft rotatable in a stationary bearing sleeve.

FIG. 2 of the drawings shows a bearing assembly 20 comprising a steel shaft 21 rotatable in a stationary bearing sleeve 22. The shaft 21 has a precision ground outer surface and the bore of the bearing sleeve 22 has a plastic lining 23 formed with a surface of gas bearing quality complementary to the surface of the shaft 22. The bearing assembly 20 is supported from an end plate 24 forming part of an enclosure 25. The bearing sleeve 22 has a flexible mounting 26 which is fitted in a boss 27 on the end plate 24 of the enclosure 25. The flexible mounting 26 comprises a ring 28 of soft rubber bonded between outer and inner metal sleeves 29 and 30. The inner metal sleeve 30 of the flexible mounting 26 fits about the bearing sleeve 22 and is located between an external end flange 31 on the bearing sleeve 22 and a circlip 32 fitted in a groove 33 around the bearing sleeve 22. The outer sleeve 29 of the flexible mounting is fitted in a counterbore 34 of the boss 27 on the end plate 24 of the housing 25.

The shaft 21 is supported in the bearing sleeve 22 against end thrusts in the direction towards the housing 25 by a hydrodynamic thrust bearing 35. The thrust bearing 35 comprises an integral flange 36 on the shaft 21. The end face of the flange 36 on the shaft 21 facing the end face of the flange 31 on the bearing sleeve 22 has a precision ground bearing surface 37. The end face of the flange 31 on the bearing sleeve 22 has a plastic coating 38 formed with a surface 39 of gas bearing quality complementary to the bearing surface 37 on the flange 36 of the shaft 21. To make the thrust bearing 35 self-acting radial pumping grooves are formed in either the bearing surface 37 or the bearing surface 39, the pumping grooves being arranged to pump air inwards between the bearing surfaces 37 and 39 on rotation of the shaft 21 within the bearing sleeve 22. A housing 40 for the thrust bearing 35 comprises a cylindrical body 41 fitted at one end about the flange 31 at the end of the bearing sleeve 22. A counter thrust ball bearing assembly 42 is fitted in the end of the housing 40. The end 43 of the shaft 21 projects from the housing 40 through the ball bearing assembly 42.

In operation of the arrangement shown in FIG. 2 the shaft 21 is driven by a friction drive belt 44 which engages the end 43 of the shaft 21 which projects from the housing 40. The shaft 21 runs in the sleeve 22 as a hydrodynamic self acting gas journal bearing the shaft 21 being supported transversely in the bearing sleeve 22 by the pressure generated hydrodynamically in the air film between the surface of the shaft 21 and the surface of the plastic lining 23 in the bearing sleeve 22.

The interior of the enclosure 25 is maintained at a pressure lower than atmospheric pressure so that a pressure differential exists acting on the shaft 21 thus applying an end loading on the shaft 21 in excess of and opposing its deadweight load. This end loading acting on the shaft 21 is supported by the hydrodynamic thrust bearing 35. The bearing assembly 20 is a highly efficient gas seal for the enclosure 25. The thrust bearing 35 is self acting and is in-pumping so that the pressure at the inner edge of the thrust bearing 35 is higher than the ambient pressure outside the thrust bearing 35.

The counter-thrust ball bearing assembly 42 is provided to support the shaft 21 when there is no axial force acting on the shaft 21 towards the enclosure 25, for example when the bearing is being run down with the enclosure 25 open to atmosphere. The ball bearing assembly is normally stationary and must be of low inertia so that it will rapidly pick up speed if the rotating shaft 21 drops onto it.

FIG. 3 of the drawings shows a bearing assembly comprising a bearing sleeve 50 rotatable on a steel shaft 51. The shaft 51 which has a precision ground outer bearing surface is supported by means of a flexible mounting (not shown but similar to that in FIG. 1). The bearing sleeve 50 has a plastic lining 52 with a bearing surface of gas bearing quality complementary to the bearing surface of the shaft 51. The gas bearing sleeve 50 is supported against upwards end thrusts on the shaft 51 by a hydrodynamic thrust bearing 53. The thrust bearing 53 comprises an integral end flange 54 on the shaft 51. The lower end face of the flange 54 facing the upper end face of the bearing sleeve 50 has a precision ground bearing surface 55. The upper end face of the bearing sleeve 50 has a plastic coating 56 formed with a surface 57 of gas bearing quality complementary to the bearing surface 55 on the flange 54 of the shaft 51. To make the thrust bearing 53 self acting radial pumping grooves are formed either in the bearing surface 55 of the flange 54 or in the bearing surface 57 of the plastic coating 56, the pumping grooves being arranged to pump air inwards between the bearing surfaces 55 and 57 on rotation of the bearing sleeve 50 relative to the shaft 51. A cylindrical housing 58 which is an interference fit and is cemented about the upper end of the bearing sleeve 50 encloses the thrust bearing 53. The housing has radial vent holes 59 and a counter-thrust bearing is formed by a ball 60 set in a recess 61 in the upper end of the shaft 51.

In operation of the arrangement shown in FIG. 3 the bearing sleeve 50 is driven on the shaft 51 by a friction drive belt 62 which engages the bearing sleeve 50 transversely below the housing 58. The sleeve 50 runs on the shaft 51 as a hydrodynamic self acting journal gas bearing as in the arrangement of FIG. 1. Upwards end thrusts acting on the bearing sleeve 50 are supported by the hydrodynamic thrust bearing 53 which is self acting and in-pumping so that the pressure at the inner edge of the thrust bearing 53 is higher than the ambient pressure outside the thrust bearing 53. The main advantages of the arrangement of FIG. 3 are firstly that the bearing is maintained cool during operation due to the thin bearing sleeve 50 rotating in air, secondly the counter thrust bearing formed by the single ball 60 and which supports the shaft 51 during run down of the bearing does not present any inertia problems and thirdly clean air flows between the bearing surfaces at all times and continuous blow away of air borne debris at both ends of the bearing assembly exists. This latter point is achieved by virtue of the fact that the thrust bearing 53 pumps in air so that a flow of air exists between the bearing surfaces of the shaft 51 and the plastic lining 52 of the bearing sleeve 50 towards the lower end of the bearing sleeve 50. Also the inflowing thrust bearing 53 receives its air from the vent holes 59 in the housing 58 and the housing 58 rotates at such a speed that any solid particulate matter attempting to pass through the vent holes 59 is centrifuged away.

Fourthly the belt 62 is centrally located on the bearing sleeve 50.

The above described bearing assemblies are capable of operating at very high speeds and in order to do so, it is preferable that both the rotatable and stationary members have low transverse moments of inertia. In particular in the bearing assemblies having a stationary shaft around which a sleeve rotates it is preferable that the stationary shaft has a low moment of inertia. The friction drive applied to the rotatable members in the bearing assemblies may be by either a belt or wheel.

The flexible mountings may comprise any suitable elastomeric material in addition to soft rubber.

Referring to FIGS. 4 and 5 of the drawings a pulley assembly 1 is shown in which a jockey pulley 2 is located in a support member 3 which is attached to a structural member 4. A steel shaft 5 is mounted on the support member by a washer 6 and a nut 7. The shaft member 5 is surrounded by a close fitting aluminium sleeve member 8 having a blind end to provide a trapped volume 9 between the blind end of the sleeve member 8 and the end of the shaft 5. The sleeve 8 has a plastic lining 10 and a port 11 adjacent to the blind end of the sleeve 8. The outer surface of the sleeve member 8 is provided with two annular flanges 12 which are integral with the sleeve 8 on the shaft 5 and provide location for a driving belt 13 on the pulley 2. The shaft 5 has a precision ground outer surface and the plastic lining 10 of the sleeve 8 is formed with a surface of gas bearing quality complementary to the shaft 5. The plastic lining 10 of the sleeve 8 may be formed for example by the method disclosed in our British Pat. No. 979,731.

The shaft 5 is provided with a longitudinal internal air duct 14, the end of which leads into the trapped volume 9 and is sealed by a ball end stop 15. An air feed pipe 16 is connected with the other end of the air duct 14. A feed jet 17 of reduced diameter immediately below the ball end stop 15 connects the air duct 14 with the trapped volume 9. Opposite to the blind end of the sleeve 8 is an adjustable end stop 18 located in the support member 3.

In operation of the arrangement of FIGS. 4 and 5 the sleeve 8 rotates on the shaft 5. The liner 10 of the sleeve 8 acts as a hydrodynamic air lubricated bearing on the shaft 5, journal loads on the sleeve being supported by the pressurised cushion of air generated in the gap between the sleeve 8 and the shaft 5 by rotation of the sleeve 8 on the shaft 5.

Compressed air is fed into the trapped volume 9 at the blind end of the sleeve member 8 through the air duct 14 and the feed jet 17. The pressure of air built up in the trapped volume 9 provides a hydrostatic air bearing supporting the sleeve member 8 longitudinally on the shaft 5. The compressed air is fed at an inlet pressure in excess of that required to balance the normal downwards end loading acting on the sleeve 8 in the direction of the arrow A. Under normal end loading conditions the sleeve 8 assumes its normal operating attitude on the shaft 5 as shown in FIG. 5, i.e. with the port 11 just covered by the end of the shaft 5. In this condition the air pressure in the trapped volume 9 automatically adjusts so that the product of the resultant pressure and the projected area of the blind end of the sleeve 8 results in a total force sufficient to support the applied end load. Transient variations in end loading acting on the sleeve 8 are accommodated by longitudinal movement of the sleeve 8 on the shaft 5. For example a transient additional downwards end loading on the sleeve 8 forces the sleeve 8 down on to the shaft 5 in the direction of the arrow A. The port 11 in the sleeve 8 is totally ocvered by the shaft 5, thus reducing the gas flow out of the trapped volume 9 and because the feed jet 17 is of restricted cross-section the pressure drop over the feed jet 17 is reduced and the pressure of air within the trapped volume 9 adjusts to that of the air duct 14 to counter-balance the additional downwards loading on the sleeve 8. On return to normal end loading conditions the sleeve 8 returns to its normal operational attitude on the shaft 5. If the sleeve 8 lifts upwards on the shaft 5 the port 11 in the sleeve 8 is uncovered by the shaft 5 and the air flow from the trapped volume 9 is increased, the pressure drop over the feed jet 17 is increased and the pressure of air in the trapped volume 9 adjusts to that of the ambient external pressure so that the supporting loading applied by the pressure of the air in the trapped volume 9 falls and the sleeve 8 drops back to assume its normal operational attitude on the shaft 5.

During normal operation the above operations occur with negligible end movement and there is negligible loss of air from the trapped volume 9 because of the sizing of the feed jet 17 in the shaft 5 and the very high restriction to flow in the gap between the sleeve 8 and the shaft 5. Any rapid fluctuations in the position of the sleeve 8 in relation to the shaft 5 due to external mechanical or internal pneumatic causes are controlled by the two end stops 15 and 18. The external stop 18 is adjustable so that minimum clearance is allowed between it and the blind end of the sleeve 8 when the position of the port 11 relative to the shaft 5 adopt its normal operating position.

An alternative form of the invention is shown in FIG. 6 in which the air pressure generated in a hydrodynamic sleeve bearing is fed to supply the air pressure for a hydrostatic air bearing providing axial support for the sleeve.

The arrangement shown in FIG. 6 is basically similar to the arrangement shown in FIG. 5 and comprises a pulley assembly 19 in which a pulley 20 is located in a support member 21. A steel shaft 22 is mounted on the support member 21 by a washer 24 and a nut 25. The shaft 22 is surrounded by a close fitting sleeve 26 having a blind end and providing a trapped volume 27 between the blind end of the sleeve 26 and the end of the shaft 22. The sleeve 26 is of aluminium and has a plastic lining 28, and two diametrically opposed vent ports 29 and 30 in the region of the trapped volume 27. The outer surface of the sleeve 26 is provided with two annular flanges 31 which are integral with the sleeve 26 and provide location for a driving belt 32. The shaft 22 has a precision ground outer surface and is provided with a longitudinally located air duct 33. The end of duct 33 leading into the trapped volume 27 being sealed by a ball end stop 34. A radial duct 35 located midway along the shaft 22 connects the air duct 33 to the outer surface of the shaft 22. Immediately behind the ball end stop 34 a feed jet 36 connects the air duct 33 into the trapped volume 27. Opposed to the blind end of the sleeve 26 is an adjustable end stop 37 located in the support member 21.

In operation of the arrangement of FIG. 6 the sleeve member 26 rotates on the shaft 22 as a hydrodynamic air lubricated bearing supporting the journal loading on the sleeve 26. The air pressure in the hydrodynamic bearing is at a maximum approximately midway along the shaft 22. This generated air pressure is fed from the surface of the shaft 22 into the air duct 33 by the duct 35. From the air duct 33 the air feed jet 36 leads air from the duct into the trapped volume 27 to provide a hydrostatic bearing to support the end thrust loads on the bearing. The normal axial attitude of the sleeve 26 is as shown in FIG. 6 and as in the arrangement of FIG. 5 the axial position of the sleeve 25 on the shaft 22 is controlled by uncovering and covering of the ports 29 and 30 with axial movements of the sleeve 26. The air pressure in the hydrostatic bearing automatically adjusts to the predetermined value which will maintain the sleeve 26 in the position related to normal end loading of the sleeve 26. The end stops 34 and 37 control any rapid fluctuations in the position of the sleeve 26 due to mechanical or internal pneumatic causes. The external stop 37 is adjustable so that minimum clearance is allowed between it and the blind end of the sleeve 26 when the ports 29 adopt their normal operating position relative to the shaft 22. FIG. 7 shows a modification of the embodiment shown in FIG. 6 in which the outer surface of the shaft 22 is provided with machined grooves 38. The grooves extend from the fixed end of the shaft 22 up to a duct 39, and are arranged so that as the sleeve 26 rotates around the shaft 22, air is drawn along the grooves into the hydrodynamic bearing clearance between the shaft 22 and the sleeve 26. This pumping action of the grooves 38 leads to increased air pressure being generated in the hydrodynamic bearing between the shaft 22 and the sleeve 26 and therefore will provide a greater air flow into the trapped volume 27 to sustain the hydrostatic bearing supporting the end thrusts in the pulley assembly 19.

In alternative arrangements of the pulley assemblies the shafts may rotate relative to the bearing sleeves. In addition gas pumping grooves may be provided in the plastic lining of the bearing sleeves.

Figure 8:
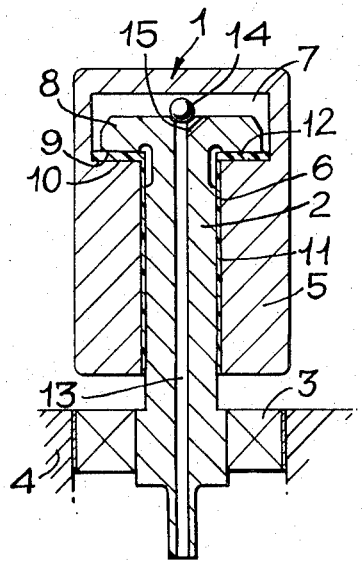

Referring to FIG. 8 of the drawings a bearing assembly 1 is shown in which a hardened steel shaft 2 is supported by a flexible mounting 3 in a structural member 4. The shaft 2 is surrounded by a close fitting bearing sleeve member 5 rotatable on the shaft 2. The bearing sleeve 5 has a blind ended bore which provides a trapped volume 7 between the blind end of the bearing sleeve 5 and the end of the shaft 2. The trapped volume 7 is of greater diameter than the bore 6 in order to accommodate an integral flange 8 on the end of the shaft 2. The flange 8 has a lower precision ground annular bearing surface 9 which is opposed by the face of an internal step 10 in the bore 6 of the bearing sleeve 5. The shaft 2 has a precision ground outer surface and the bore 6 of the bearing sleeve 5 has a plastic lining 11 formed with a surface of gas bearing quality complementary to the surface of the shaft 12. The bearing surface in the plastic lining 11 of the bearing sleeves may be formed for example by the method disclosed in our British Pat. No. 979,731. The face of the internal step 10 in the bore 6 of the bearing sleeve 5 has a plastic coating 12 with a surface of gas bearing quality complementary to the surface 9 on the flange 8 of the shaft 2. The bearing surface of the plastic coating 12 is grooved to provide the gas pumping action between the bearing surfaces. Alternatively the metal bearing surface 9 may be grooved to achieve the same effect.

The shaft 2 is provided with a longitudinal internal air duct 13, the end of which leads into the trapped volume 7 and is sealed by a ball end-stop 14. A feed jet 15 of reduced diameter and located immediately below the ball end-stop 14 connects the air duct 13 into the trapped volume 7.

In operation of the bearing assembly 1 shown in FIG. 8 the sleeve member 5 rotates on the shaft 2. The plastic lining 11 of the bearing sleeve 5 acts with the shaft 2 as a hydrodynamic air lubricated journal bearing, journal loads on the sleeve being supported by the pressurised cushion of air generated in the gap between the plastic lining 11 of the bearing sleeve 5 and the shaft 2 by rotation of the bearing sleeve 5 on the shaft 2. Compressed air is fed into the trapped volume 7 through the air duct 13 and the feed jet 15. The pressure of air built up in the trapped volume 7 provides a hydrostatic air bearing cushion supporting the bearing sleeve 5 longitudinally on the shaft 2 against end thrusts acting on the bearing sleeve 5 in the direction towards the shaft 2.

The pressure of the air acting in the trapped volume 7 causes the bearing sleeve 5 to take up a position on the shaft 2 such that a small clearance exists between the bearing surface 9 on the flange 8 of the shaft 2 and the bearing surface of the plastic coating 12 on the step 10 in the bearing sleeve 5. The bearing surface 9 on the flange 8 of the shaft 2 and the bearing surface of the plastic coating 12 on the step 10 of the bearing sleeve 5 thus co-operate to act as a hydrodynamic air lubricated thrust bearing working counter to the longitudinal end thrust acting on the bearing sleeve 5 due to the pressure of the air in the trapped volume 7. The bearing assembly 1 can thus operate in any attitude and at the same time maintain precise location of the sleeve member 5 on the shaft 2. If a failure of the compressed air supply to the bearing assembly 1 should occur the ball end stop 14 ensures that a safe running condition can be maintained for a reasonable period of time.

Figure 9:
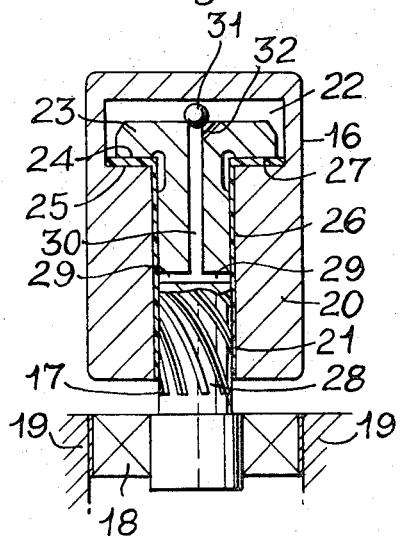

The arrangement shown in FIG. 9 is similar to the arrangement shown in FIG. 8 and comprises a bearing assembly 16 in which a shaft 17 is supported by a flexible mounting 18 in a structural member 19. The shaft 17 is surrounded by a close fitting bearing sleeve member 20 which is rotatable on the shaft 17. The bearing sleeve 20 has a blind ended bore 21 which provides a trapped volume 22 between the blind end of the sleeve 20 and the end of the shaft 17. The trapped volume 22 is of greater diameter than the bore 21 in order to accommodate an integral flange 23 on the end of the shaft 17. The flange 23 has a lower precision ground annular bearing surface 24 which is opposed by the face of an internal step 25 in the bore 21 of the bearing sleeve 20. The shaft 17 has a precision ground outer surface and the bore 21 of the bearing sleeve 20 has a plastic lining 24 formed with surface of gas bearing quality complementary to the surface of the shaft 17. The face of the internal step 25 in the bore 21 of the bearing sleeve 20 has a plastic coating 27 with a surface of gas bearing quality complementary to the bearing surface 24 on the flange 23 of the shaft 17. The surface of the shaft 17 is provided with machined pumping grooves 28 extending from the fixed end of the shaft 17 up to radial ducts 29 located mid way along the shaft 17. The ducts 29 extend from the surface of the shaft 17 to a longitudinal duct 30 in the shaft 17. The duct 30 leads from the ducts 29 to the end of the shaft 17 in the trapped volume 22, the end of the duct 30 being sealed by a ball end stop 31. Immediately behind the ball end stop 31 a restricted feed jet 32 connects the duct 30 with the trapped volume 22. The surface of the plastic coating 27 on the face of the internal step 25 in the bore 21 of the bearing sleeve 20 is grooved to provide gas pumping action between the bearing surfaces. Alternatively the metal bearing surface 24 may be grooved to achieve the same effect.

In operation of the bearing assembly 16 shown in FIG. 9 the sleeve member 20 rotates on the shaft 17 as a hydrodynamic air lubricated journal bearing, journal loads on the sleeve 20 being supported by the pressurised cushion of air generated in the gap between the plastic lining 26 of the sleeve 20 and the bearing surface of the shaft 17 by rotation of the sleeve member 20 on the shaft 17 and by the action of the pumping grooves 28 on the shaft 17. The air pressure in the hydrodynamic journal bearing is at a maximum approximately mid way along the shaft 17. Thus compressed air is fed from the surface of the shaft 17 into the duct 30 by the ducts 29. From the duct 30 the air feed jet 32 feeds the compressed air into the trapped volume 22 to provide a hydrostatic air bearing cushion supporting the bearing sleeve 20 longitudinally on the shaft 17 against end thrusts acting on the bearing sleeve 20 in the direction towards the shaft 17. The pressure of the air acting in the trapped volume 22 causes the bearing sleeve 20 to take up a position on the shaft 17 such that a small clearance exists between the bearing surface 24 on the flange 23 of the shaft 17 and the bearing surface of the plastic coating 27 on the face of the internal step 25 in the bore 21 of the bearing sleeve 20. The bearing surface 24 and the bearing surface of the plastic coating 27 thus co-operate to act as a hydrodynamic air lubricated thrust bearing working counter to the longitudinal thrust acting on the bearing sleeve 20 due to the pressure of the air in the trapped volume 27. If the air supply to the trapped volume 22 is curtailed in any way the ball end stop 31 ensures that safe running conditions can be maintained for a reasonable period of time.

Figure 10:
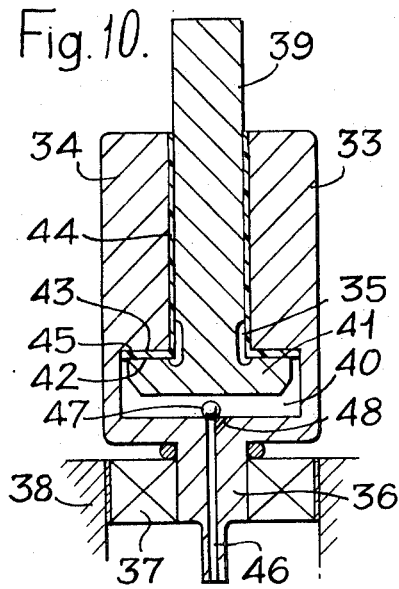

FIG. 10 shows a bearing assembly 33 comprising a bearing sleeve member 34 having a blind ended bore 35. The bearing sleeve 34 has an axial extension 36 by means of which the bearing sleeve 34 is supported by a flexible mounting 37 from a structural member 38. A shaft 39 is rotatable within the bore 35 of the bearing sleeve 34. The blend ended bore 35 of the bearing sleeve 34 provides a trapped volume 40 between its blind end and the end of the shaft 39. The trapped volume 40 is of greater diameter than the bore 35 in order to accommodate an internal flange 41 on the end of the shaft 39. The flange 41 has an upper precision ground annular bearing surface 42 which is opposed by the face of an annular internal step 43 in the bore 35 of the bearing sleeve 34. The shaft 39 has a precision ground outer surface and the bore 35 of the bearing sleeve 34 has a plastic lining 44 formed with a bearing surface of gas bearing quality complementary to the surface of the shaft 39. The face of the internal step 43 in the bore 35 of the bearing sleeve 34 has a plastic coating 45 with a surface of gas bearing quality complementary to the bearing surface 42 on the flange 41 of the shaft 39. The bearing surface of the plastic coating 45 or the complementary bearing surface 42 is grooved to provide the gas pumping action between these bearing surfaces when the shaft 39 is rotated.

The extension 36 of the sleeve member 34 is provided with an internal air duct 46, the end of which leads into the trapped volume 40 and is sealed by a ball end-stop 47. A feed jet 48 of reduced diameter and located immediately below the ball end stop 47 connects the air duct 46 into the trapped volume 40.

In operation of the bearing assembly 33 shown in FIG. 10 the shaft 39 rotates within the stationary sleeve 34. The complementary gas bearing surfaces of the plastic lining 44 and the shaft 39 act as a hydrodynamic air lubricated journal bearing supporting journal loads with the pressurised cushion of air generated in the gap between the bearing surfaces. Compressed air is fed into the trapped volume 40 through the air duct 46 and the feed jet 48.

The air pressure built up in the trapped volume 40 provides a hydrostatic air bearing cushion supporting the shaft 39 against downwards end thrusts in the bearing sleeve 34. The pressure of the air acting in the trapped volume 40 causes the shaft 39 to take up a position in the bearing sleeve 34 such that a small clearance exists between the bearing surface 42 on the flange 41 of the shaft 39 and the bearing surface of the plastic coating 45 on the face of the internal step 43 in the bore 35 of the bearing sleeve 34. The bearing surface 42 and the bearing surface of the plastic coating 45 thus co-operate to act as a hydrodynamic air lubricated thrust bearing working counter to the longitudinal thrust acting on the bearing sleeve 34 due to the pressure of the air in the trapped volume 40. The bearing assembly 33 can thus operate in any required attitude and at the same time maintain precise longitudinal location of the shaft 39 in the sleeve member 34. If a failure of the compressed air supply to the bearing assembly 33 occurs the ball end stop 47 ensures that a safe running condition can be maintained for a reasonable period of time.

Figure 11:
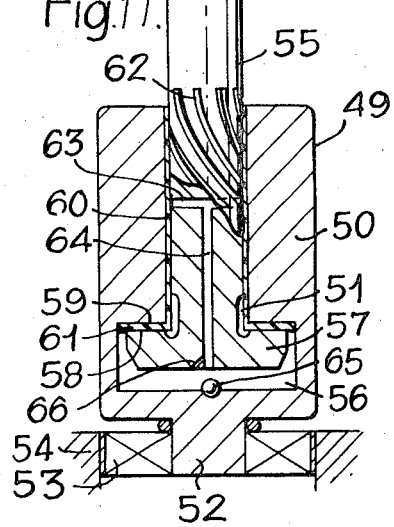

The bearing assembly 49 shown in FIG. 11 is similar to that shown in FIG. 10 and comprises a bearing sleeve member 50 having a blind ended bore 51. The bearing sleeve 50 has an axial extension 52 by means of which the bearing sleeve 50 is supported by a flexible mounting 53 from a structural member 54. A shaft 55 is rotatable within the bore 51 of the bearing sleeve 50. The blind ended bore 51 of the bearing sleeve 50 provides a trapped volume 56. The trapped volume 56 is of greater diameter than the bore 51 in order to accommodate an integral flange 57 on the end of the shaft 55. The flange 57 has an upper precision ground annular bearing surface 58 which is opposed by the face of an annular internal step 69 in the bore 51 of the bearing sleeve 51. The shaft 55 has a precision ground outer surface and the bore 51 of the bearing sleeve 50 has a plastic lining 60 formed with a bearing surface of gas bearing quality complementary to the surface of the shaft 55. The face of the internal step 59 in the bore 51 of the bearing sleeve 50 has a plastic coating 61 with a surface of gas bearing quality complementary to the bearing surface 58 on the flange 57 of the shaft 55. The bearing surface of the plastic coating 61 is grooved to provide gas pumping action between these bearing surfaces when the shaft 55 is rotated. The surface of the shaft is provided with machined pumping grooves 62 extending from the open end of the bearing sleeve 50 up to radial ducts 63 located mid way along the shaft 55 and extending from the surface of the shaft into a longitudinal duct 54 in the shaft 55. The duct 64 leads to the end of the shaft 55 and is sealed at its end. Immediately opposite the sealed end of the duct 64 a ball end stop 65 is located in the bearing sleeve 50. A feed jet 66 connects the duct 64 into the trapped volume 56.

In operation of the bearing assembly 49 shown in FIG. 11 the shaft 55 rotates in the fixed bearing sleeve 50, hydrodynamic air lubrication being sustained between the bearing surface of the shaft 55 and the bearing surface of the plastic lining 60 of the bearing sleeve 50. Journal loads on the shaft 55 are supported by the pressurised cushion of air generated in the gap between the shaft 55 and the plastic lining 60 of the bearing sleeve 50. The pressure generated is due to rotation of the shaft 55 in the bearing sleeve 50 and due to the pumping action of the grooves 62 on the surface of the shaft 55. Maximum pressure is generated about mid way along the shaft 55 in the region of the radial ducts 63 in the shaft 55. Thus compressed air is fed through the ducts 63 and the longitudinal duct 64 in the shaft 55 is fed from the duct 64 through the air feed jet 66 into the trapped volume 56 at the blind end of the bore 51 in the bearing sleeve 50. This provides a hydrostatic air bearing cushion in the trapped volume 56 supporting the shaft 55 longitudinally against downwards end thrusts in the bearing sleeve 50. The pressure of the air acting in the trapped volume 56 causes the shaft 55 to take up a position in the bearing sleeve 50 such that a small clearance exists between the bearing surface 58 on the flange 57 of the shaft 55 and the bearing surface of the plastic coating 61 on the face of the internal step 59 in the bearing sleeve 50. The bearing surface 58 and the bearing surface of the plastic coating 61 thus co-operate to act as a hydrodynamic air lubricated thrust bearing working counter to the longitudinal thrust acting on the shaft 55 due to the pressure of the air in the trapped volume 56. If the air supply to the trapped volume 56 is interrupted the ball end stop 65 ensures that safe running conditions can be maintained for a reasonable period of time.

Figure 12:
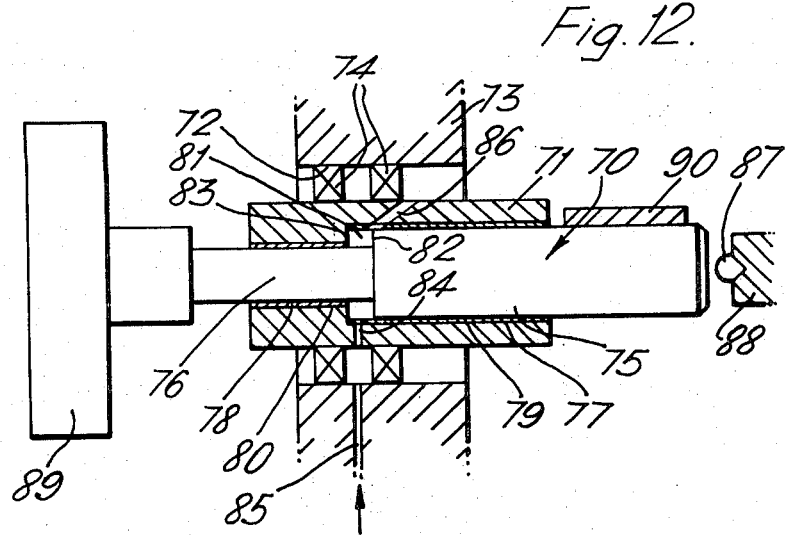

Referring to FIG. 12 of the drawings a bearing assembly is shown comprising a steel shaft 70 rotatable in a stationary bearing sleeve 71. The bearing sleeve 71 is supported in an aperture 72 in a structural member 73 by two flexible mounting members 74. The shaft 70 is stepped in two parts, a main part 75 and a smaller diameter part 76. The bore of the bearing sleeve 71 is also stepped in two parts, a main part 77 complementary to the main part 75 of the shaft 70 and a smaller diameter part 78 complementary to the smaller diameter part 76 of the shaft 70. The surfaces of the parts 75 and 76 of the shaft 70 are precision ground and the main part 77 of the bore of the bearings sleeve 71 has a plastic lining 79 with a surface of gas bearing quality complementary to the surface of the main part 75 of the shaft 70. The smaller diameter part 78 of the bore of the bearing sleeve 71 has a plastic lining 80 with a surface of gas bearing quality complementary to the surface of the smaller diameter part 76 of the shaft 70. A free space 81 is defined in the main part 77 of the bore of the bearing sleeve 71 between a shoulder 82 on the shaft 70 and a shoulder 83 in the bore of the bearing sleeve 71. An air feed port 84 of restricted cross section passes radially through the bearing sleeve 71 from the space between the two mounting members 74 for the bearing sleeve 71 to the free space 81 in the bore of the bearing sleeve 71. A compressed air inlet passageway 85 extends through the structural support member 73 to the space between two mounting members 74 for the bearing sleeve 71. A vent port 86 passes obliquely through the bearing sleeve 71 from the free space 81 in the bore of the bearing sleeve 71 to the outside of the bearing sleeve 71. A ball end stop 87 is provided in a support member 88 adjacent of the end of the shaft 70 which extends beyond the main part 77 of the bore of the bearing sleeve 71. The other end of the shaft 70 is fitted with a rotor 79.

In operation of the arrangement shown in FIG. 12 the shaft 70 is driven by a friction drive belt 90 engaging tangentially with the end of the shaft 70 which extends beyond the main part 77 of the bore of the bearing sleeve 71. The shaft 70 runs in the bearing sleeve 71 as a hydrodynamic self acting journal gas bearing. The main part 77 of the bore of the bearing sleeve 71 in conjunction with the main part 75 of the shaft 70 forms one hydrodynamic journal gas bearing and the smaller diameter part 78 of the bore of the bearing sleeve 71 in conjunction with the smaller diameter part 76 of the shaft 70 forms a second hydrodynamic journal gas bearing.

Compressed air is fed through the passageway 85 in the support member 73 into the space between the two mounting members 74 for the bearing sleeve 71. Compressed air feeds from the space between the mounting members 74 through the air feed port 84 in the bearing sleeve 71 into the free space 81 in the bore of the bearing sleeve 71. The pressurized cushion of air thus set up in the free space 81 provides a hydrostatic thrust bearing supporting the shaft 70 longitudinally in the bearing sleeve against end thrusts acting on the shaft 70 in the direction towards the rotor 89. Under normal end loading conditions the shaft 70 runs in the bearing sleeve 71 in the position shown in FIG. 12, that is with the vent port 86 just covered by the end of the main part 75 of the shaft 70. Transient variations of end thrust acting on the shaft 70 in the direction towards the rotor 89 are thus supported by the cushion of compressed air trapped in the free space 81 in the bore of the bearing sleeve 71. Transient variations in end thrust acting on the shaft 70 in the opposite direction away from the rotor 89 result in longitudinal movement of the shaft 70 in the bearing sleeve 71 in this direction. Movement of the shaft 70 results in uncovering of the vent port 86 so that the free space 81 in the bore of the bearing sleeve 71 is vented to atmosphere until the end thrust acting on the shaft 70 in the direction away from the rotor 89 ceases and the normal end thrust acting on the shaft 70 in the direction towards the rotor 89 is re-established so that the shaft 70 then resumes its normal longitudinal operating position in the bearing sleeve with re-establishment of the cushion of compressed air in the free space 81 in the bore of the bearing sleeve 71.

Figure 13:
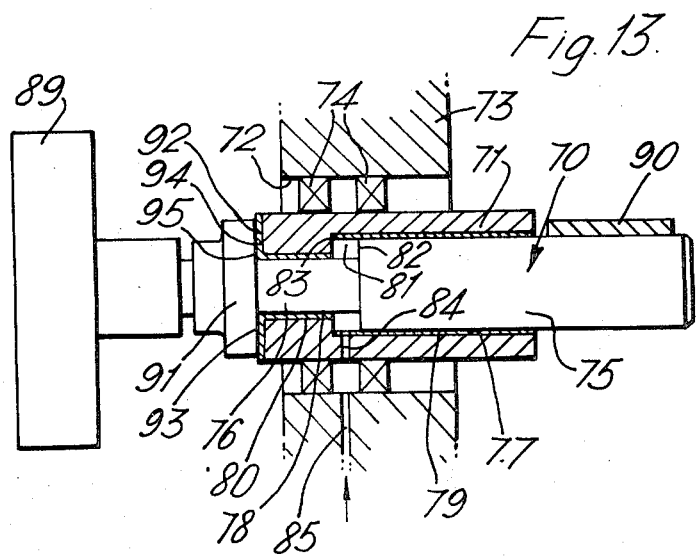

The arrangement of FIG. 12 only provides longitudinal gas bearing location for the shaft 70 against end thrusts in the one direction towards the rotor 89. The arrangement of FIG. 13 is similar to the arrangement of FIG. 12 and similar parts are given the same reference numerals. However the arrangement of FIG. 13 is modified to provide longitudinal gas bearing location for the shaft 70 in both directions towards and away from the rotor 89.

In the arrangement of FIG. 13 a thrust collar 91 is fitted on the shaft 70 between the rotor 89 and the end face 92 of the bearing sleeve 71. The end face of the thrust collar 91 facing the end face 92 of the bearing sleeve 71 has a precision ground bearing surface 93. The end face 92 of the bearing sleeve 71 has a plastic coating 94 formed with a bearing surface 95 of gas bearing quality complementary to the bearing surface 93 on the thrust collar 91. The bearing surface 93 on the thrust collar 91 and the bearing surface 95 of the plastic coating 94 on the end face 92 of the bearing sleeve 71 together form a hydrodynamic thrust bearing supporting the shaft 70 longitudinally against end thrusts in the direction away from the rotor 89. To make the hydrodynamic thrust bearing self acting radial pumping grooves are formed in either the bearing surface 93 or the bearing surface 95. Support for the shaft 70 against end thrusts acting in the direction towards the rotor 89 is, as in the arrangement of FIG. 12, by a cushion of compressed air trapped in the free space 81 in the bore of the bearing sleeve 71. However the vent port 86 in the bearing sleeve 71 of the arrangement of FIG. 12 is not required in the arrangement of FIG. 13 and is omitted, the pressure of the air cushion being no longer self-adjusting, air is admitted to the cushion of a present pressure.

We claim:

1. A journal gas bearing assembly comprising a fixed bearing sleeve, a shaft rotatable in the bearing sleeve, the surface of the shaft and the bore of the bearing sleeve having cooperating bearing surfaces of a quality such that gas lubrication can be sustained between the shaft and the bearing sleeve, the shaft having a part of major diameter separated by an external step from a part of minor diameter, the bore of the bearing sleeve having a corresponding part of major diameter separated by an internal step from a part of minor diameter, the shaft being supported against longitudinal movement in the bearing sleeve in one direction by a hydrostatic thrust bearing formed by a cushion of gas trapped in the closed volume within the bore of the bearing sleeve between the external step on the shaft and the internal step in the bore of the bearing sleeve, and means being provided for feeding compressed gas to the hydrostatic thrust bearing comprisng an inlet port in the bearing sleeve connecting an external source of gas under pressure with the closed volume within the bore of the bearing sleeve.

2. A journal gas bearing assembly as claimed in claim 1 wherein means are provided for limiting longitudinal movement of the shaft in the bearing sleeve in the opposite direction to the direction in which the shaft is supported against longitudinal movement in the bearing sleeve by the hydrostatic thrust bearing, said means comprising a vent hole in the bearing sleeve positoned so as to be obstructed by the surface of the shaft when the shaft is in its normal running position within the bearing sleeve, supported against longitudinal movement, in the one direction, in the bearing sleeve by the hydrostatic thrust bearing and such that on initial longitudinal movement of the shaft in the bearing sleeve in the opposite direction the vent hole in the bearing sleeve is uncovered by the shaft so that the closed volume within the bore of the bearing sleeve defining the hydrostatic thrust bearing is vented to atmosphere.

3. A journal gas bearing assembly as claimed in claim 1 wherein the shaft is supported against longitudinal movement in the direction opposite to which the hydrostatic thrust bearing supports the shaft against longitudinal movement in the bearing sleeve by a hydrodynamic thrust bearing comprising a transverse annular bearing surface of the bearing sleeve and a corresponding transverse annular bearing surface on the shaft.

4. A journal gas bearing assembly as claimed in claim 3 wherein the hydrodynamic thrust bearing comprises a flange on the end of the minor diameter part of the shaft outside the bearing surface, the flange having an annular bearing surface facing a corresponding annular bearing surface on the adjacent end of the bearing sleeve.

5. A journal gas bearing assembly as claimed in claim 1 wherein the bearing sleeve is flexibly mounted and has a low transverse moment of inertia.

References Cited
UNITED STATES PATENTS 3,420,583   1/1969   Hirs ................ 308—9

CHARLES J. MYHRE, Primary Examiner

F. S. F. SUSKO, Assistant Examiner